United States Patent [19]

Chang et al.

[11] Patent Number: 5,310,983
[45] Date of Patent: May 10, 1994

[54] SERVO-CONTROLLED FEED RATE CONTROL DEVICE FOR CNC ELECTRIC SPARK MACHINES

[75] Inventors: Yih-Fang Chang; Yaw-Shen Lai, both of Hsinchu Hsien, Taiwan

[73] Assignee: Industrial Technology Research Institute, Hsinchu, Taiwan

[21] Appl. No.: 965,352

[22] Filed: Oct. 23, 1992

[51] Int. Cl.⁵ .................................................. B23H 7/18
[52] U.S. Cl. ..................................... 219/69.16; 318/610
[58] Field of Search ................. 219/69.16; 318/610; 364/162, 166

[56] References Cited

U.S. PATENT DOCUMENTS

| | | | |
|---|---|---|---|
| 4,069,413 | 1/1978 | Rutledge et al. | 364/166 |
| 4,339,650 | 7/1982 | Tanaka et al. | 219/69.16 |
| 4,864,091 | 9/1989 | Boccadoro | 219/69.16 |
| 4,983,800 | 1/1991 | Taneda | 219/69.16 |

FOREIGN PATENT DOCUMENTS

| | | | |
|---|---|---|---|
| 60-255312 | 12/1985 | Japan | 219/69.16 |
| 61-94104 | 5/1986 | Japan | 364/162 |
| 61-279425 | 12/1986 | Japan | 219/69.16 |
| 61-288923 | 12/1986 | Japan | 219/69.16 |
| 64-16317 | 1/1989 | Japan | 219/69.13 |

Primary Examiner—Geoffrey S. Evans
Attorney, Agent, or Firm—W. Wayne Liauh

[57] ABSTRACT

A feed rate control device for controlling the feeding operation of the electrode of a computerized numerical control type electric spark machine is equipped with an amplitude limiter, a regulator, and a proportional-plus-integral compensator. The amplitude limiter is capable of automatically limiting the amplitude of the input signal according to the moving situation of the electrode of the electric spark machine. By using of the amplitude limiter, the sensitivity of the system may be limited to a suitable level and therefore the stability of the whole system is increased. The proportional-plus-integral compensator is used to compensate the steady state error caused by improper low resolution when the output signal of the amplitude limiter is below an preliminary level. The regulator is used for facilitating the adjustment of the sensitivity of the system according to user's practical experiences.

7 Claims, 7 Drawing Sheets

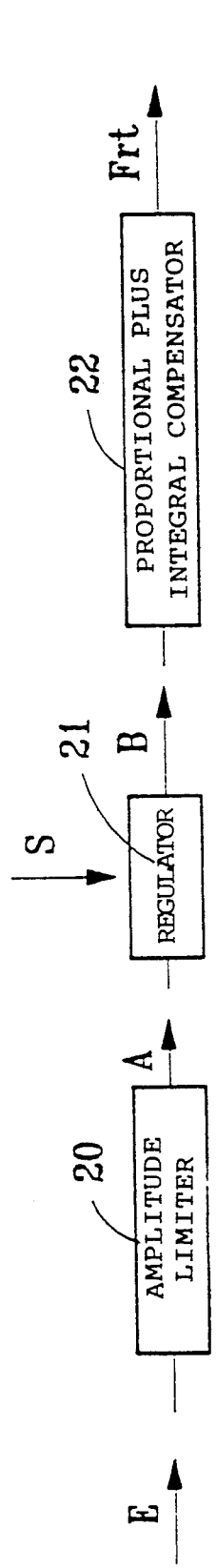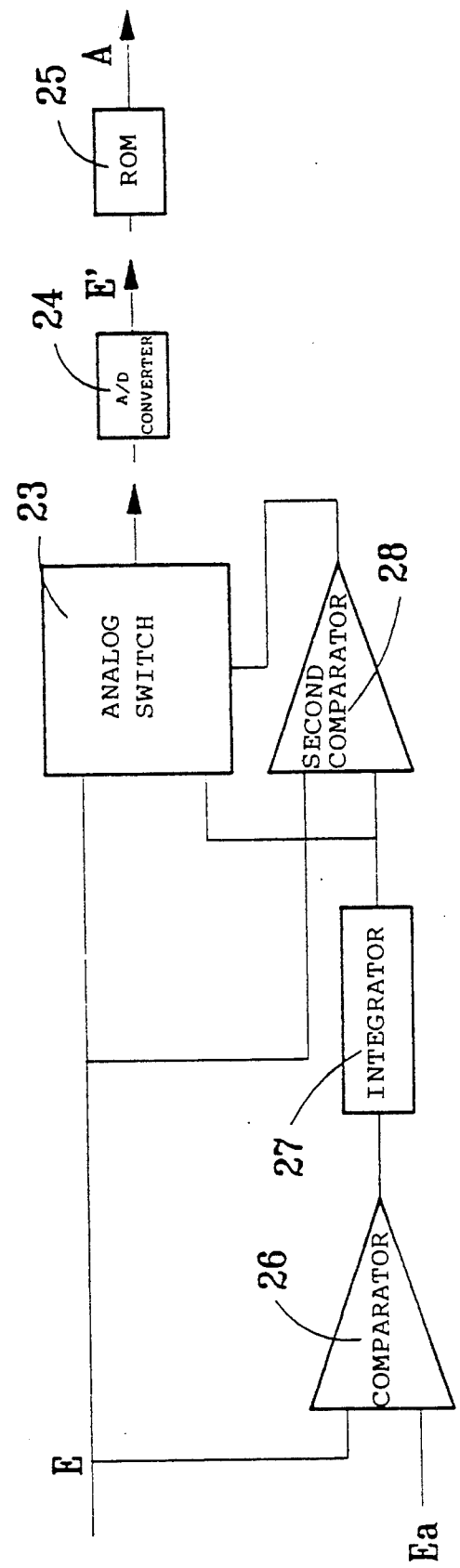
FIG. 5
FIG. 6

SERVO-CONTROLLED FEED RATE CONTROL DEVICE FOR CNC ELECTRIC SPARK MACHINES

BACKGROUND OF THE INVENTION:

The present invention relates to a feed rate control device for an electric spark machine, and more particularly to a servo-controlled feed rate control device for precisely controlling the feeding operation of the electrode of a computerized numerical controlled electric spark machine. Under the control of the present invention, the stability of the system is increased, the steady-state error is decreased, and the discharging efficiency is improved.

The well-known technique of electric discharging machining is widely used for removing metallic materials from the surface of a workpiece. In operation, an instantaneous electric spark is continuously supplied between the stationary workpiece to be processed and the electrode of the machine. That is, the machining of the workpiece is completed by controlling the movement of the electrode supplied with a discharging energy with specific frequency to discharge from the electrode to the workpiece. For a useful and perfect electric spark machine, the discharging current strength, the discharging time period, and the movement of the electrode thereof must be controlled precisely and properly in order to keep the discharging spark strength unchangeable and remain the gap between the electrode and the workpiece uniform.

In the operation of the electric discharge machining, the purpose of controlling the feed rate of the electrode is to control that the electrode may move along a predetermined path and keep a narrow gap from the workpiece to be processed to make a continuously discharging performance on the surface of the workpiece. However, it is found that the gap between the electrode and the workpiece is often deposited with undesired carbon deposit and residual metallic materials, which will decrease the discharging efficiency of the system. Besides, the machining parameters of the system and discharging erosion surface occurred on the surface of the electrode also effect the performance efficiency of the system. In this regard, the feed rate of the electrode must be controlled and adjusted according to real operating situations of the system, rather than moved at a constant operation speed.

An ideal discharging voltage of an electric spark machine is shown in FIG. 1. It is preferable that inserting an ignition delay before discharging happening. In this regard, the conventional electric spark machine is designed to be capable of generating a feed rate control signal to servo-motor driving circuit by filtering the signal and comparing the filtered signal with a preliminary reference signal. As shown in FIG. 2, it shows a general function block diagram of a computerized numerical controlled electric spark machine which typically composed of a regulator 10, a CNC interpolator 11, and a driving circuit 12. An electrode 13 is employed, which is capable of performing discharging operation to a workpiece to be processed. The regulator may be used to adjust the stability of the system at the start point of discharging period.

In order to shorten the idle running time, the operator may manually adjust the sensitivity of the system larger, so that the electrode may reach the preliminary discharging position at a faster speed. Further, when the electrode reaches the discharging position, the operator is necessary to adjust the sensitivity lower to make the system stable. It is obvious that the conventional adjusting operation is rather inconvenient in operation.

SUMMARY OF THE INVENTION

To overcome the aforementioned drawbacks of the prior art technique, the present invention is to provide a servo-controlled feed rate control device for automatically and precisely controlling the feeding operation of the electrode. Under the control of the present invention, the sensitivity of the system may be adjusted perfectly to shorten idle running time; the stability of the system during discharging period may be increased; the steady-state error caused by improper feeding resolution may be decreased; and the discharging efficiency of the system may be improved.

The other object of the present invention is to provide a feed rate control device with an amplitude limiter for controlling a CNC electric spark machine. The amplitude limiter may automatically adjust the amplitude of input signal according to the real moving condition of the electrode, so that the stability of the system is increased.

Another object of the present invention is to provide a proportional feed rate control device for controlling the electrode of the electric spark machine. The control device is provided with a proportional-plus-integral compensator capable of compensating steady-state error caused by improper low resolution of the system.

Another object of the present invention is to provide a feed rate control device with a regulator for facilitating the operator to manually adjust the sensitivity of the system according to his practical experiences.

These and other objects and features of the invention will become more apparent from the following description taken in connection with the accompanying drawings.

BRIEF DESCRIPTION OF THE DRAWINGS

FIG. 5 is a functional block diagram schematically showing the feed rate control device in accordance with the first embodiment of the present invention;

FIG. 6 is a functional block diagram schematically showing the amplitude limiter shown in FIG. 5 in greater detail;

DESCRIPTION OF THE PREFERRED EMBODIMENT

Figure 1:
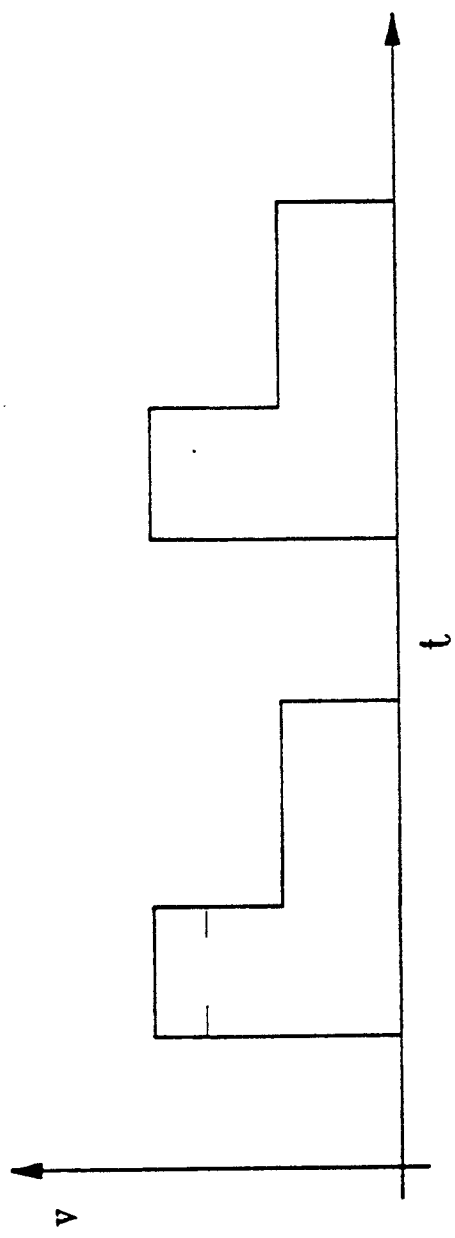
FIG. 1 illustrates an ideal discharging voltage of an electric spark machine.
Figure 2:
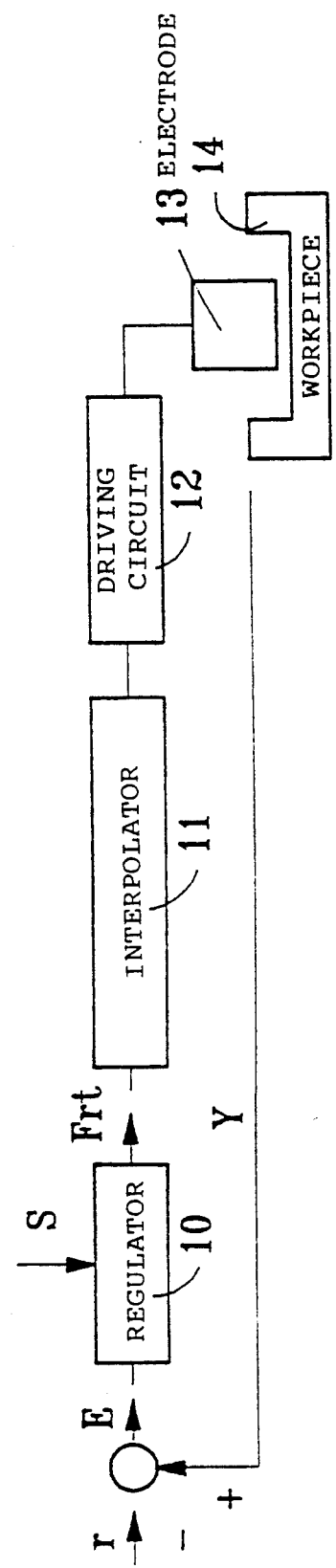
FIG. 2 is a general block diagram of a conventional CNC electric spark machine.
Figure 3:
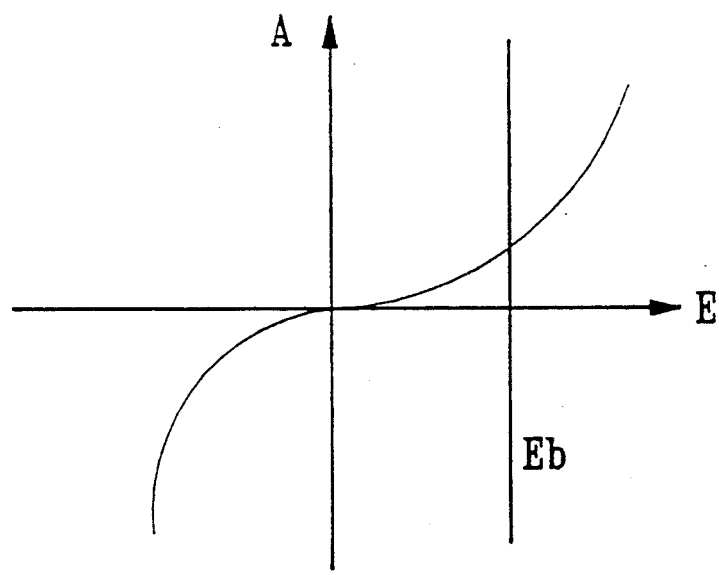
FIG. 3 illustrates the relationship between a control signal A and an error signal E.

Referring now to FIG. 3, it illustrates the performance curve between a control signal A and an error signal E of the present invention. In order to move the electrode of the electric spark machine faster during idle running time(i.e. before the time that the electrode reaches a preliminary discharging position of the machine) and to make the sensitivity of the system lower during discharging period, the performance curve shown in FIG. 3 is particularly designed to be a form of parabolic curve. The parabolic curve may be indicated by the following equation:

$$A = (\text{sign of } E) Ks \times E^2 \quad (1)$$

wherein
 A represents control signal;
 E represents error signal;
 Ks represents a multiple constant.

In the equation (1) above, the constant Ks is a multiple factor of the sensitivity of the whole system. Equation (1) and FIG. 3 show that the sign (i.e., positive or negative) of the control signal "A" remains the same as that of the error signal, however, its magnitude (i.e., absolute value) is a parabolic function of the error signal.

As shown in FIG. 3, both the error signal E and the control signal A are large during the electrode of the electric spark machine operated in idle running operation mode. The sensitivity of the system in idle running operation mode is larger than that in discharging operation mode because the error signal E is smaller during discharging period. The sensitivity of the system may be indicated by the slope of the performance curve as shown in the drawing. In such case, although it is possible to obtain a larger control signal A during idle running operation mode and to get a smaller sensitivity during discharging operation mode, the system still has possibilities of continuously remaining a high sensitivity during discharging because the interferences factor such as carbon deposit and residual metal discussed earlier. In order to overcome this problem, it is necessary to employ an amplitude limiter to limit the amplitude of the input signal. Preferably, the amplitude limiter is effective at the starting point of the boundary period of the input signal to effectively limit the amplitude of the output signal, so that the sensitivity of the system may be effectively limited to an expected level and therefore the stability of the whole system is increased.

To detect the start point of the boundary time period of the electrode, it may be achieved by simply detecting whether the amplitude of the input signal is greater than a given signal level Eb or not. However, the input signal often remains a large amplitude both in idle running operation mode and before discharging operation mode. In this case, the detecting device will misjudge the boundary situation and therefore unconditionally limit the amplitude of the input signal. As a result, the input signal will be improperly limited to a small amplitute which will further cause the operation speed of the electrode very slow during idle running time. For this reasons, the present invention is provided with a method to release the improper limitation by the following equations:

(a) in case the E is larger than Ea, then $$Eb = Eo + K1 \times \int_0^{tb} dt \quad (2)$$

This is designated as a linear integrating means.

(b) in case the E is less than Eam, the set Eb=Eo. This is designated as a truncating means.

In the equation (2), the Eo is an initial limited value (normally very small). In order to avoid the integrated result being too large which may cause the integrated time is too long during idle running time, the integrated time in the equation is therefore limited to a constant integrated time ranging from 0 to tb. Under this condition, the constant K1 may be calculated by the following equation:

$$K1 = \frac{E\max - Eo}{tb} \quad (3)$$

where Emax is the maximal error during the idle running operation.

Figure 4A:
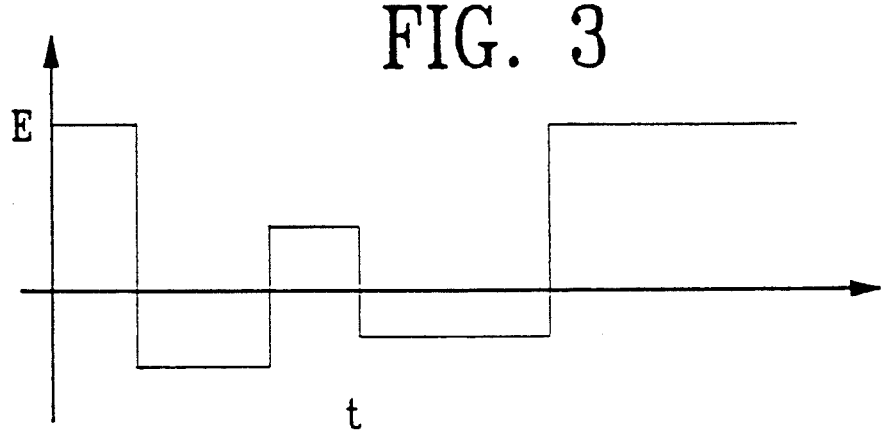
FIG. 4a shows a waveform of an unlimited input signal.
Figure 4B:
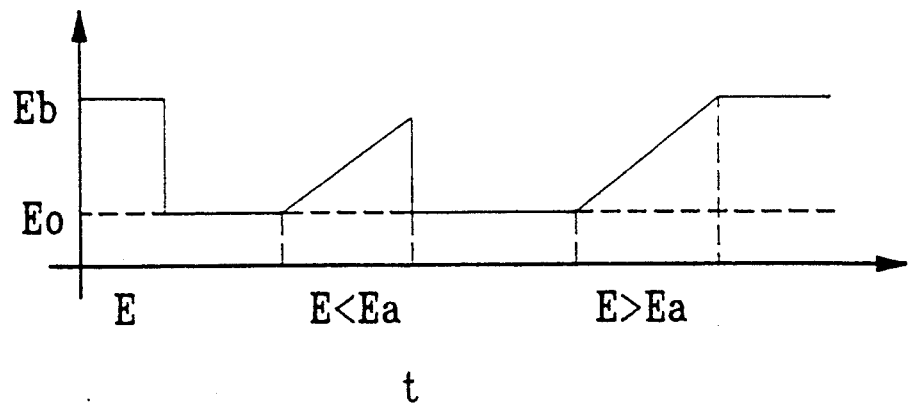
FIG. 4b shows a waveform of a limited input signal.

After the limitation of the equation (2), the input signal as shown in FIG. 4a will be limited to the wave form as shown in FIG. 4b. As a result, the output signal may be limited to a smaller amplitude and to thereby provide a lower sensitivity for the system.

The present invention is provided with a function of facilitating the operator to manually adjust the stability of the system according to operator's practical experiences. The equation is as follows:

$$B = A \times \frac{S \times Frto}{K2} \quad (4)$$

wherein
 B represents the output signal of the regulator;
 K2 represents a constant;
 Frto represents the original preset feed rate of the electric spark machine;
 S represent the multiple factor of the system sensitivity.

In the equation (4), the original preset feed rate Frto may be adjusted to satisfy different type of machines. The sensitivity S of the system may be adjusted by operator via a regulator which may be mounted on the control panel of the machine. In such an arrangement, it is therefore convenient to initially adjust the stability of the whole system manually.

Through the processes of equations (1) to (4), if the signal B is still small, the signal is often ignored when it is input to the interpolator of the electric spark machine because the resolution of feed rate is too low. In such a case, the electrode will be suspended causing steady-state error. In order to compensate the steady-state error, it is necessary to use a proportional-plus-intergral compensator to further process the signal B. The compensated equation of the compensator may be indicated by the following equation:

$$Frt = B + K3 \times \int_0^{ti} B dt \quad (5)$$

In the equation (5), the integrated time is limited to a constant time of ti to avoid long integrated time. The constant K3 is used to adjust the compensated amount. After this compensating process, the steady-state error will be effectively eliminated after an expected time period.

Based upon the above operation theory, the present invention is provided with a servo-controlled feed rate control device for controlling the feeding operation of the electrode of a computerized numerical controlled electric spark machine. As shown in FIG. 5, which shows the functional block diagram of the control device in accordance with the first embodiment of the present invention. In this preferred embodiment, the feed rate control device mainly consists of an amplitute limiter 20, a regulator 21, and a proportional-plus-integral compensator 22.

Referring to FIG. 6, it is a functional block diagram of the amplitute limiter 20 shown in FIG. 5 in greater detail. The amplitute limiter is capable of receiving a deviation signal E in a form of analog signal and then limiting the amplititute of the signal according to equation (2) discussed above. In the circuit arrangement of the amplitute limiter 20, a comparator 26 is employed to compare the signal E with a preliminary reference value Ea. In case that the value of the signal E is larger than that of the signal Ea, the constant Kl will be integrated by an integrator 27 which is connected to the output terminal of the comparator. The integrated signal of the integrator 27 is indicated by reference symbol Eb. A second comparator 28 is employed to further compare the integrated signal Eb of the integrator 27 with the deviation signal E. An analog switch 23 is employed to provide a connected path for the signal E or Eb. In case that the value of the signal E is larger than that of the signal Eb, the analog switch 23 will permit the signal Eb to output to an analog-to-digital converter 24. On the contrary, in case that the value of the signal E is smaller than that of the signal Eb, the deviation signal E will be sent to the analog-to-digital converter 24 via the analog switch 23. After this process of limitation, the analog signal is limited to an expected level. Thereafter, the limited analog signal will be converted to a digital signal form indicated by E' by means of the analog-to-digital converter 24. A read only memory 25 is used to store a set of data of parabolic curve expressed as Eq. (1) in a form of a ROM data table. The digital output signal E' of the analog-to-digital converter 24 will find a matched data in the ROM data table of the read only memory 25, and then output a corresponding data as an output signal A.

Figure 7:
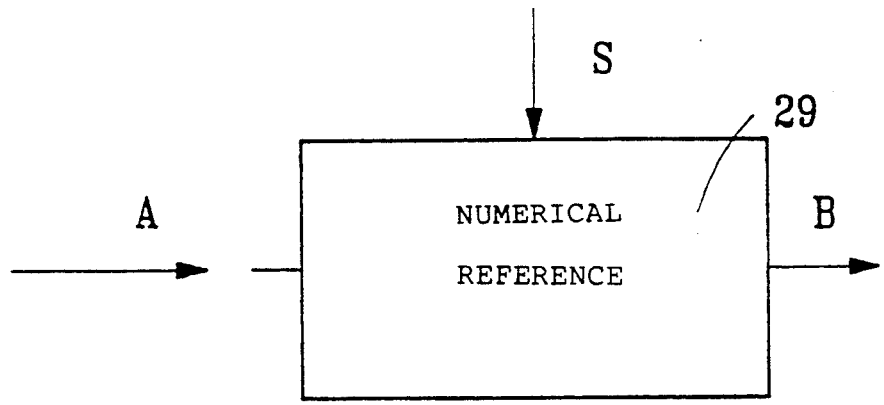
FIG. 7 is a functional block diagram schematically showing the regulator shown in FIG. 5 in greater detail.
Figure 8:
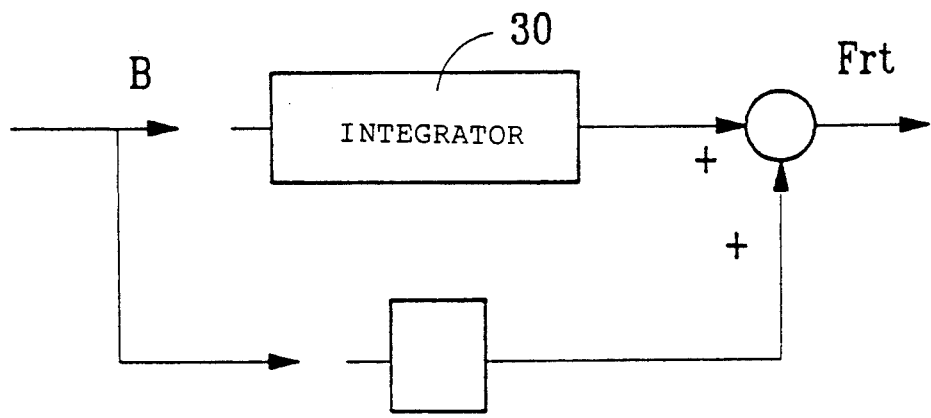
FIG. 8 is a functional block diagram schematically showing the proportional-plus-integral compensator shown in FIG. 5 in greater detail.

FIG. 7 shows the functional block diagram of the regulator of the present invention, in which the numerical reference 29 represents the function of equation (4) discussed above. The purpose of the regulator is to facilitate the operator to adjust the initial stability of the system according to his practical experiences. In the first embodiment of the present invention, the functions of the regulator is satisfied with the equation (4), in which the constant K2 of the equation is set according to the general performance features of the standard type CNC electric spark machines. Normally, the constant K2 is set in advance and is not changeable. However, there must be minor feature difference between two different types of electric spark machine. For example, the sensitivity of the system must be different in some degree between two different types of electric spark machines. In such a consideration, in order to facilitate the operator to adjust the sensitivity within a range from 10-100%, the present invention is therefore provided with the regulator. Under the regulating control of the regulator, the output value B of the regulator may be almost served as a desired feed rate for the interpolator of the CNC electric spark machine FIG. 8 shows the functional block diagram of the proportional-plus-integral compensator shown in FIG. 5 of the present invention in greater detail In practice, some of the feed rate of the interpolator of the CNC electric spark machine is indicated by integer only. In such case, if the feed rate of the system is less than 1, the electrode of the machine will be suspended. As a result, it will cause a phenomenon of steady-state error which is resulted from that the sensitivity of the system is too low. In order to compensate the steady-state error, the present invention employs a proportional-plus-integral compensator connected to the output of the regulator shown in FIG. 7. The proportional-plus-integral compensator includes an integrator 30 which is capable of performing the integrating operation of the signal B according to the equation (5) discussed above. When the signal B is less than 1, the integrator 30 may send out a output signal Frt larger than 1 after a preliminary time period. The output signal Frt is sent to the interpolator of the machine.

Figure 9:
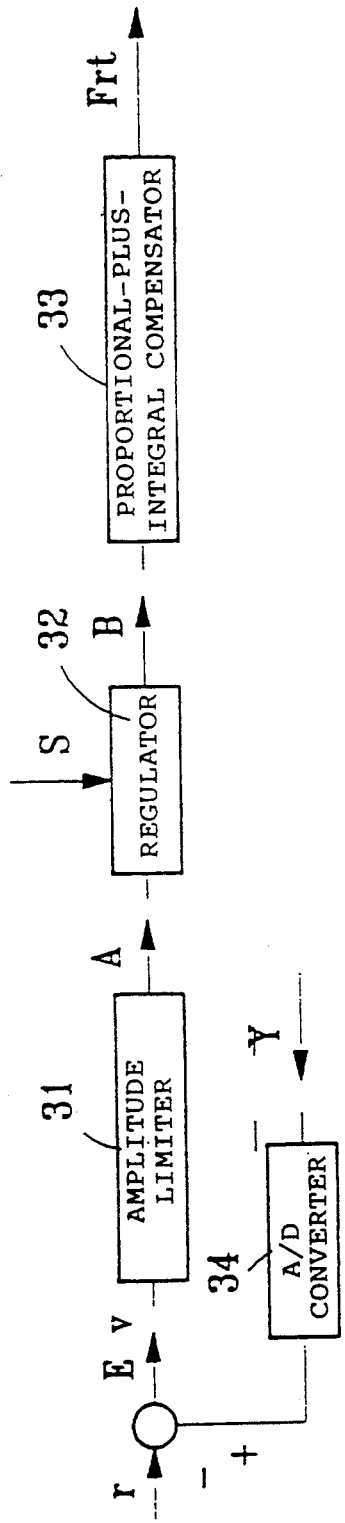
FIG. 9 is a functional block diagram schematically showing the feed rate control device in accordance with the second embodiment of the present invention.

In the first embodiment of the present invention, the amplitute limiter may be configured as a hardware configuration using electronic elements such as transistors and/or operational amplifiers. Because the interpolator of the electric spark machine is operated in digital operational form, in case the operational speed of the interpolator is fast enough, all the functions of the differential amplifier, the amplitute limiter, the regulator, and the proportional-plus-integral compensator may be performed by a software module of the system which forms the second embodiment digital type servo-controlled feed rate control device. As shown in FIG. 9, it shows the digital type servo-controlled feed rate control device for a CNC electric spark machine, which is somewhat similar to the first embodiment of the present invention as shown in FIG. 6. The control device of the second embodiment of the present invention is composed of an amplitute limiter 31, a regulator 32, a proportional-plus-integral compensator 33 and an analog-to-digital converter 34. In this alternative embodiment, the analog-to-digital converter 34 is used to detect the gap voltage across the electrode and workpiece and then obtain the desired feed rate according to the equation (1), (4), and (5). Therefore, the amplitute limiter 31 of the second embodiment is not necessary to include another analog-to-digital converter 24 as that of the first embodiment shown in FIG. 6.

Figure 10:
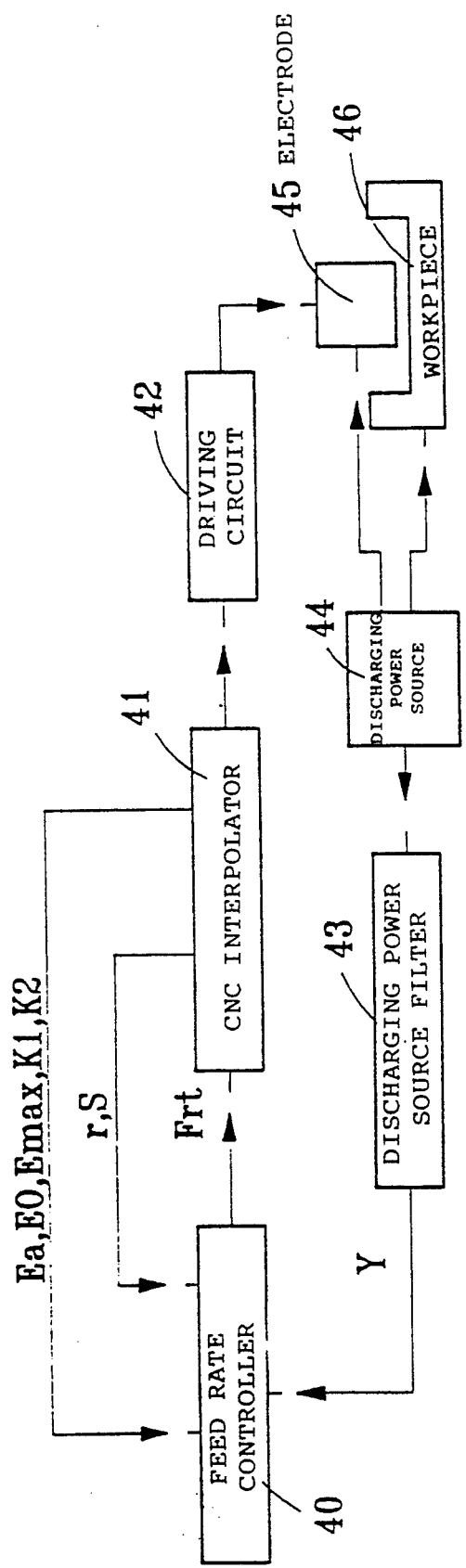
FIG. 10 is a block diagram of a CNC electric spark machine combined with a feed rate control device of the present invention.

FIG. 10 is a block diagram schematically showing the CNC electric spark machine combined with a servo-controlled feed rate control device of the present invention. As shown in the drawing, it is noted that the configuration is composed of a feed rate controller 40, a CNC interpolator 41, a driving circuit 42, a discharging power source filter 43, a discharging power source 44, an electrode 45, and a workpiece 46.

Figure 11:
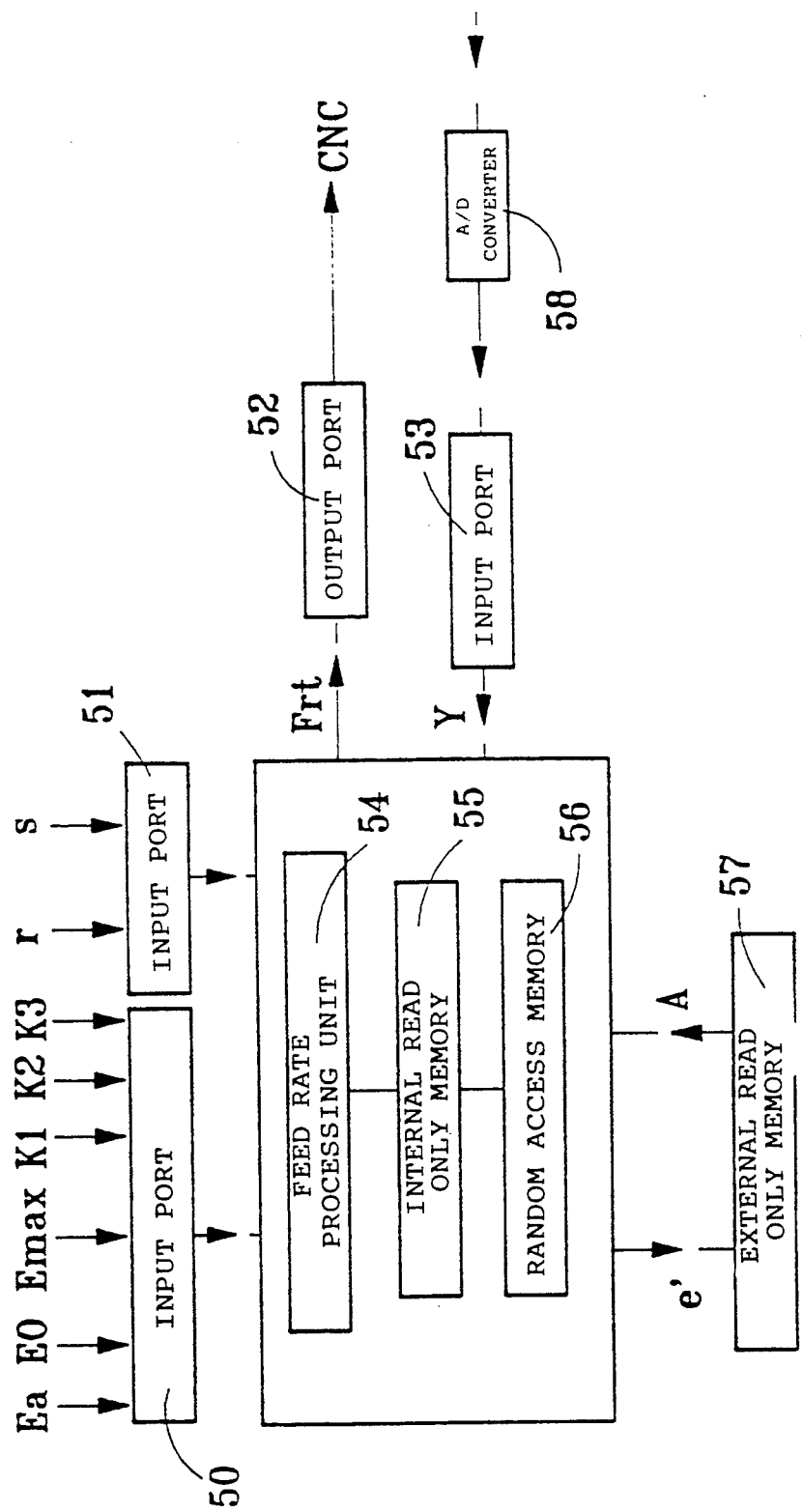
FIG. 11 shows the configuration of the servo-controlled feed rate controller in accordance with the present invention.

FIG. 11 is a functional block diagram schematically showing the hardware configuration of the servo-controlled feed rate controller shown in FIG. 10 of the present invention. The feed rate controller is provided with a plurality of communication ports including two input ports 50, 51, and an output port 52. All the communication ports of the feed rate controller are electrically coupled with the CNC electric spark machine via control lines as indicated in the drawing. In addition, the feed rate controller is provided with a fourth input port 53 which is electrically coupled with an analog-to-digital converter 58 for receiving the gap voltage Y from the discharging power source filter 43 shown in FIG. 10. Furthermore, the feed rate controller includes a feed rate processing unit 54, an internal read only memory 55, a random access memory 56, and an external read only memory 57. The internal read only memory 55 is used for storing system software of the feed rate processing unit 54; while the external read only memory 57 is used for storing the transfer data table of the parabolic curve established by the equation (1).

Figure 12:
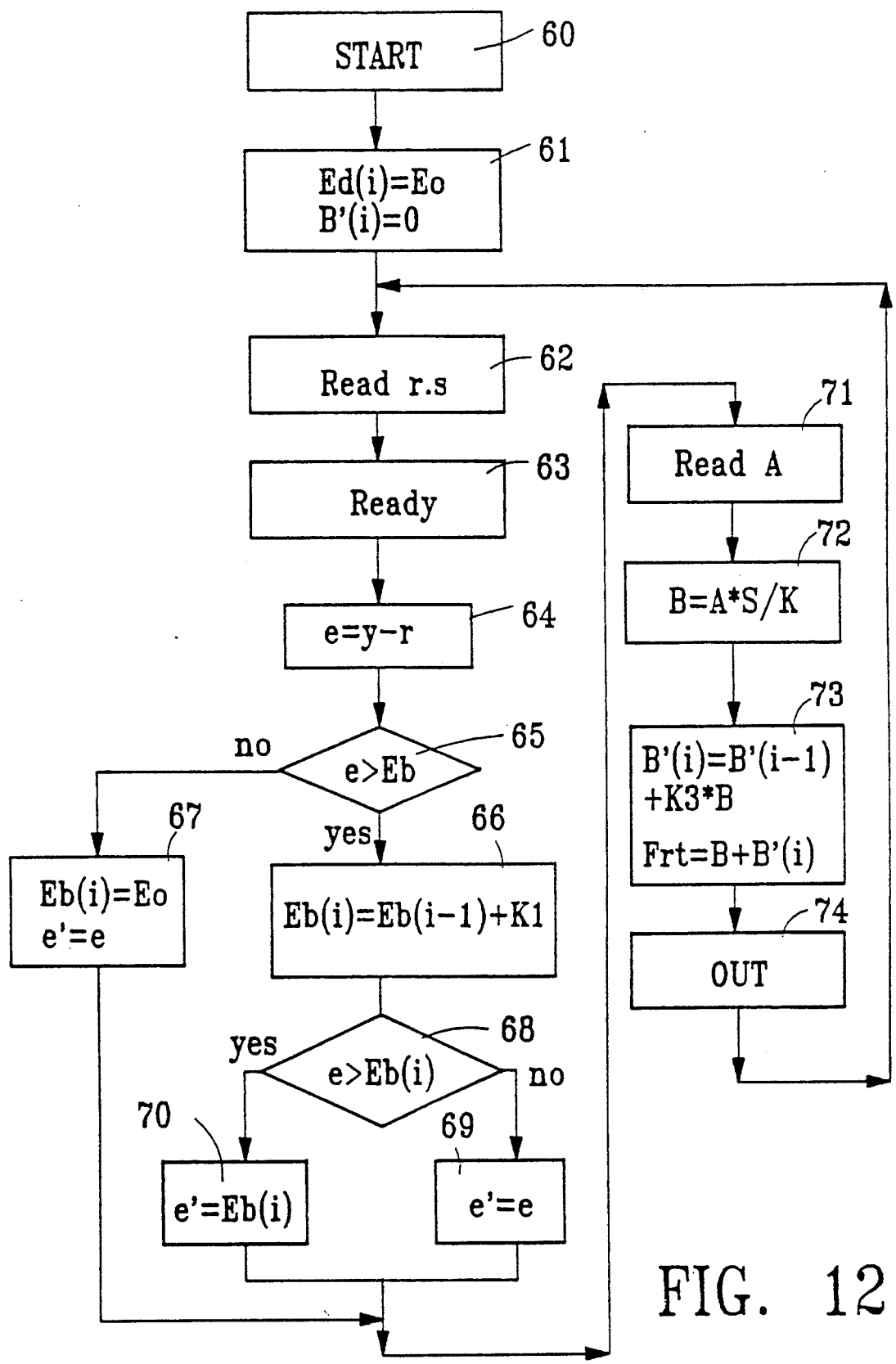
FIG. 12 is a flow diagram showing the processes of the feed rate controller shown in FIG. 11.

Referring now to FIG. 12 with reference to FIG. 11, it is a flow diagram showing the servo-controlled feed rate processes of the present invention. The processes include a first step 60 which is used to read constant parameters Ea, Eo, Emax, K1, K2, K3 from the input port 50. The second step 61 is a setting step capable of setting $Eb(i)=Eo$ and $B'(i)=0$. A step 62 is used to read variable parameters r and s from the input port 51. A step 63 is used to read gap voltage Y from the input port 53. A step 64 is used to set the $e=Y-r$. A judge step 65 is used to judge conditions that:

A. If a condition that the e is greater than Ea is true, a step 66 is performed which sets $Eb(i)=Eb(i-1)+K1$ and then the flowing judge step 68 is performed. The judge step 68 is used to judge conditions that:

(a). If e is greater than Eb(i), a step 70 is performed which indicates that e' is equal to Eb(i).

(b). If e is less than Eb(i), a step 69 is performed which indicates that the e' is equal to e.

After the processes above, a step 71 will be performed. B. If the condition that the e is greater than Ea is not true, a step 67 is performed which indicates the Eb(i) is equal to Eo and the e' is equal to e. Thereafter, a step 71 is performed.

The step 71 is used to find an matched data A from the parabolic data table stored in the external read only memory 57, according to the value of e'. After that, a step 72 is performed, which indicates B is equal to A*S/K2. Continuously, a proportional-plus-integral step 73 is performed, which indicated that $B'(i)=B-B'(i-1)+K3*B$ and $Frt=B+B'(i)$. Finally, a step 74 is performed, which is used to send out an output signal Frt to the CNC electric spark machine via the output port 52 shown in FIG. 11. After the step 74 is finished, the control flow of the system is returned to the step 62 for reading variable parameter again.

In conclusion, the present invention is to provide a servo-controlled feed rate control device capable of proportionally controlling the feed rate of a computerized numerical controlled electric spark machine. In accordance with the preferred embodiment of the present invention, the control device is composed of an amplitude limiter, a regulator, and a proportional-plus-integral compensator. The control device is capable of automatically limiting the amplitude of the input signal according to the moving situation of the system by means of the amplitude limiter, so that the sensitivity of the system, slope of the parabolic curve FIG. 3 may be limited to a suitable level and therefore the stability of the whole system is increased. Furthermore, the steady-state error caused by improper low resolution may be compensated by means of the proportional-plus-integral compensator, so that the discharging efficiency of the system may be improved. In addition, for facilitating the user to adjust the sensitivity of the system according to his practical experiences, the present invention is equipped with the regulator mounted on the control panel.

Many changes and modifications in the above described preferred embodiment of the invention will be apparent to those skilled in the art and can be carried out without departing from the scope thereof. Accordingly, the scope of the present invention is defined only by the following appended claims.

What is claimed is:

1. A feed rate control device for providing a proportional feed rate to an electrode of a computerized controlled electric spark machine in accordance with an input signal by detecting gap voltage across the electrode during discharging period, comprising:
    means for receiving an input signal and means for limiting amplitude of the input signal and for sending out a limited parabolic output signal;
    a proportional-plus-integral compensator for preventing the electrode of the electric spark machine from improper suspension causing steady-state error in case that the output signal of the limiting means is less than a preliminary level; and
    a regulating means for suitably adjusting the sensitivity of the feed rate of the electric spark machine.

2. A feed rate control device device for providing a proportional feed rate to an electrode of a computerized controlled electric spark machine in accordance with an input signal by detecting gap voltage across the electrode during discharging period, comprising:
    (a) an amplitude limiter containing an input means for receiving an input signal, a first output means for sending out an output signal, and a signal stabilizing means for limiting the amplitude of said output signal and increasing stability of said output signal;
    (b) a proportional-plus-integral compensator for controlling said feed rate of said electrode, containing a receiving means for receiving said output signal from said amplitude limiter, sensitivity adjusting means for adjusting a sensitivity for said feed rate, and a second output means for generating an output control signal; and
    (c) a regulator for manipulating the sensitivity adjustment of said proportional-plus-integral compensator.

3. The feed rate control device of claim 2 wherein said amplitude limiter provides a limited parabolic relationship between said input signal and said output signal.

4. The feed rate control device of claim 2 wherein said regulator is manually operated.

5. The feed rate control device of claim 3 wherein said regulator is manually operated.

6. The feed rate control device of claim 2 wherein said stabilizing means comprises a linear integrating means and a truncating means to limit said output signal to a wave form.

7. A feed rate control device comprising:
    (a) means for receiving an input error signal and means or limiting amplitude of the input error signal and for sending out a limited parabolic output error signal;
    (b) means for controlling feed rate of an electrode with a proportional-plus-integral compensator, further comprising an input signal from the limited parabolic output error signal, a sensitivity adjustment for feed rate, and generating an output control signal; and
    (c) means for regulating the sensitivity adjustment for feed rate of the proportional-plus-integral compensator.

* * * * *